United States Patent Office 3,417,309
Patented Dec. 17, 1968

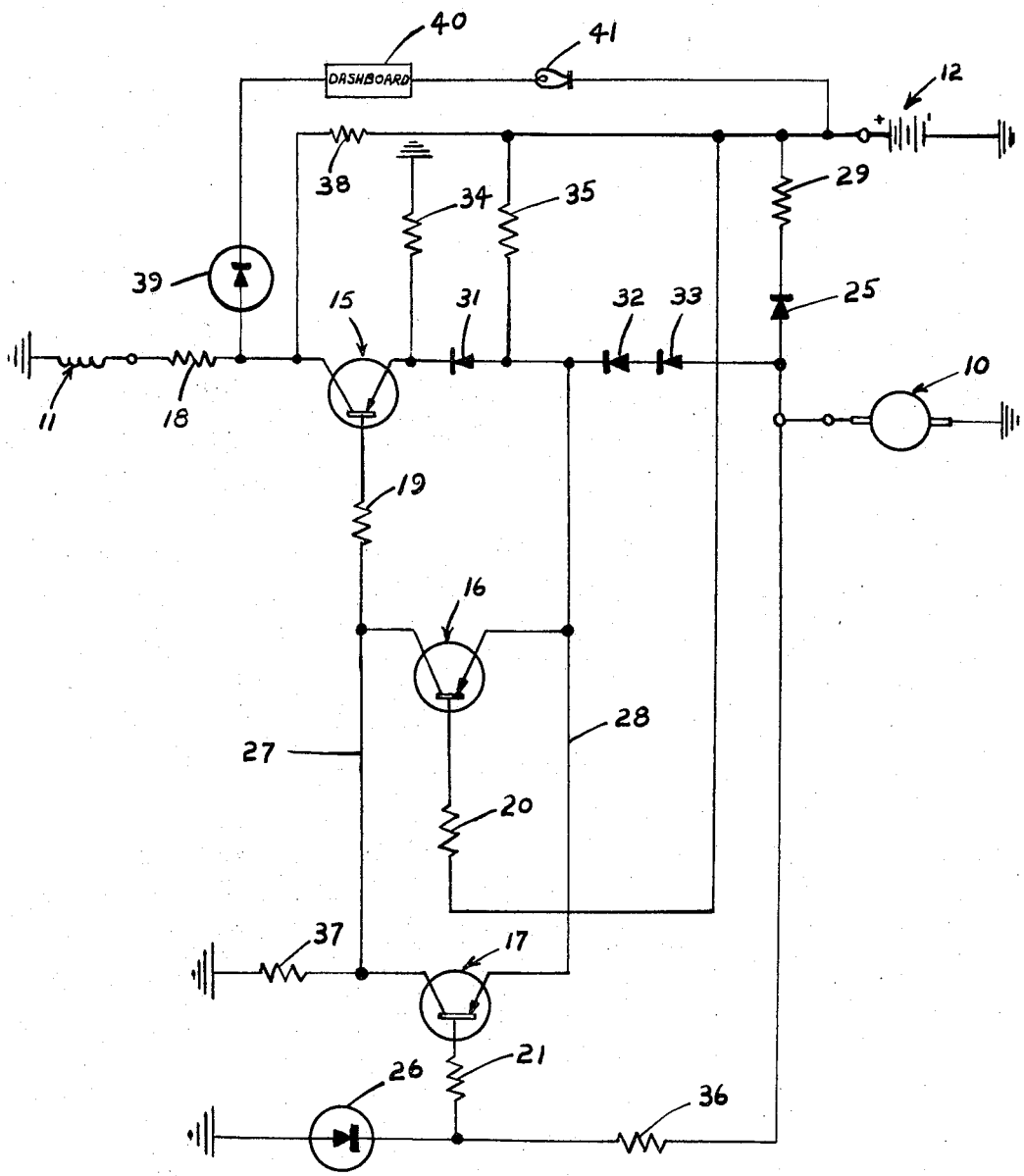

3,417,309
BATTERY CHARGER CIRCUIT RESPONSIVE TO VOLTAGE AND CURRENT OF CHARGING SOURCE
Robert F. Schuyler, 43—17 48th St., Long Island City, N.Y. 11104
Filed Oct. 23, 1965, Ser. No. 503,168
1 Claim. (Cl. 320—32)

ABSTRACT OF THE DISCLOSURE

An automobile electrical system control in which transistors are employed to control the current and voltage outputs of the system D.C. generator. Two of the transistors act to control a third transistor which is connected with the generator field winding. Diodes are connected to the emitters of the current and voltage responsive transistors so that the transistors are utilized as solid state switches to control current input to the field.

This invention relates to electrical circuit controls. It is more particularly concerned with controlling the operation of automobile, aircraft, driven generator sets, and like electrical generating systems, with transistor devices.

Voltage and current regulation, as for example in automobile electrical generating systems, is required to proportion the discharge rate of the generator to the demand for battery charging, lamp load, operating accessory equipment such as the heater, radio and the like. This is generally achieved by means of a regulator which controls voltage and current independently of each other in order to achieve optimum control of output characteristics. These regulators, as for example, the double core type, may comprise a number of relays each associated with the separate functions of battery cutoff, current regulation and voltage regulation. The overall function of the regulator thus is to (1) limit generator voltage output to a level consonant with the fixed operating voltage ratings of accessory equipment, diminish the charging rate to the battery as the battery voltage nears that of the generator output to prevent overcharge with consequent chemical deterioration in the battery; (2) limit generator current output to preclude overheating resulting from internal IR loss; and (3) prevent reverse current flow from the battery to the generator if the generator voltage output is zero or less than that of the battery potential. However, various shortcomings are associated with these prior art regulators. For one thing, the relay contacts are subject to pitting and erosion engendered by near continuous operation. In addition, the constant operation of the relays with attendant fatigue effect promotes mechanical failure. And of major consequence is the limitation that overall electrical system response time to change is dependent on the inertial recovery rate of the relay armatures and the field coil current buildup time of the relays. Finally, current regulation with electromechanical regulators may become erratic when the generator drive (automobile engine) rapidly accelerates or decelerates in speed.

It is therefore an object of the present invention to provide a regulator device for regulating current and voltage output in an automobile electrical generating system which utilizes transistor devices to achieve regulation.

Another object is to provide a transistorized voltage regulator for automobile electrical generating systems which in use requires no servicing, adjustments, is not subject to mechanical deterioration, and has a service life generally commensurate with the life of the vehicle itself.

A further object herein is to provide a transistorized voltage regulator for automobile electrical generating systems which is adapted for use in existing automobile types without requiring special installation alterations or modifications thereto.

Still another object of the present invention is the provision of a transistorized voltage regulator for automobile electrical generating systems which responds instantaneously to changes in system conditions in that it functions without reliance on mechanical devices to effect compensations.

A further object of this invention is to provide a transistorized voltage regulator for automobile electrical generator systems which performs regulation functions absolutely and irrespective of variations in generator drive speed, load demand, generator brush conditions and the like.

Other objects of the present invention will in part be obvious and will in part appear hereinafter.

The foregoing objects may be achieved by providing a regulating device which makes use of the "switching" characteristics of transistors to perform the functions of electromechanical devices, and comprising a heavy duty PNP type output field controlling transistor in a common emitter saturated-switching mode which is indirectly interposed between the battery and the generator field-winding, with the generator field-winding serving as the collector load. This field controlling transistor is normally "on" for maximum field flux during most of the regulation cycle. For turnoff, the field controlling transistor's base current source may be shunted out or bypassed through either one or both of separate current and voltage sensing transistors connected in parallel with the field controlling transistor and which operates when maximum design current and/or voltage values are reached, as for example the rated output of a battery. The voltage sensing transistor (PNP type) which is normally in an "off" condition, is turned "on" when its base path receives armature current through a Zener diode which exhibits breakdown or reverse conduction just below the predetermined optimum generator voltage limit.

The current sensing transistor which also is normally in an "off" condition, is turned on when slightly less than the maximum predetermined armature current is drawn, as the potential drops across a low-ohmic value transistor in the armature-to-battery charging path, suitable other diodes and biasing resistors are connected with the transistors as will appear.

The invention will appear more clearly from the following detailed description when taken in conjunction with the accompanying drawing showing by way of non-limiting example a preferred embodiment of the inventive concept.

The single figure of drawing is a schematic diagram of an automobile electrical generating system which includes a generator armature winding 10, a generator field winding 11, and a battery 12. The regulator elements include a heavy duty output field controlling transistor 15 (PNP type), a current sensing transistor 16 (PNP type), and a voltage sensing transistor 17 (PNP type). The generator field winding 11 serves as the collector load for the field controlling transistor 15 being connected to the collector thereof through a resistor 18 that serves to limit the generator field current to a value slightly greater than that required for maximum field flux.

According to the invention and as will be discerned by those skilled in the art, voltage and current regulation are more readily effected by controlling the current delivered to the generator field winding 11 rather than by utilizing a system which controls the delivered output of the generator. Thus, when the battery 12 is below rated capacity, the generator will supply current through the field control transistor 15, which is in a normally "on" condition, to the generator field winding 11. In other words, the transistor 15 is in a state permitting current flow through the emitter-collector. The latter current flows through the resistor 18 to the field winding 11 to produce sufficient field flux in the field winding to enable the generator to deliver the required circuit output current for charging the battery 12. The use of resistor 18 in the circuit is not essential, but it is preferable to employ same so as to limit the generator field current to a value slightly greater than that necessary for maximum saturated magnetic flux. In the present system, a resistance in the order of ~3 ohms is used. A resistor with a higher value would limit the response time of the system as well as the generator output at low r.p.m. On the other hand, too small a resistance could permit excessive current delivery to the field winding 11, with consequent overheating and possible burnout where it was under-designed. When the battery 12 reaches full charge, its voltage will approach that of the generator. (An isolation charging diode 25 prevents reverse flow of current from the battery 12 to the generator armature 10.) It thus becomes necessary to turn off the generator delivery to the battery. To that end, the voltage level of the batttery 12 is sensed by means of the voltage sensing transistor 17 which is normally biased "off" (no current flow through emitter-collector). As the voltage in the battery approaches that of the generator, a Zener diode 26 which is chosen to exhibit breakdown or reverse conduction at a level just below optimum generator battery charging voltage will break down and current will flow through the resistor 21 and the base-to-emitter path of transistor 17. Supplying this base current to transistor 17 will bias it to an "on" condition, permitting current to flow from the emitter thereof to the collector, shorting out the circuit loop designed at 27 and 28. Shorting out the circuit loop 27, 28 effectively shorts out the turn-on base current for transistor 15 and applies a reverse biasing potential by means of the voltage drop across diode 31. Back biasing the base of transistor 15 switches it to an "off" condition resulting in a shutdown of current flow to the generator field winding 11. As will be noted in the drawing, a resistor 36 provides a turn-off return path for transistor 17.

The current sensing transistor 16 is also in a normally "off" condition. As the current output of the generator approaches maximum value, the current flow through a low value resistor 29 in the armature winding battery loop will cause a small potential drop which in part will be imposed upon resistor 20 initiating a base current flow therethrough such as to turn transistor 16 to an "on" condition. The resistor 29, in the generator armature-to-battery charging path, is selected to have a low value in the order of less than 1/30 of an ohm so that a voltage drop of less than about one volt caused by a less than 30 amp current will not exceed the back biasing of transistor 16 and turn it "on." The current sensing transistor 16 when biased to an "on" position will function in the same manner as the voltage sensing transistor 17 to bias the field control transistor 15 to an "off" position, thereby reducing or completely shutting down current flow to the generator field 11.

The transistors 16 and 17 are, as will be seen, connected in parallel with the emitters thereof connected in common along with that of the field control transistor 15 through back biasing diode 31. The collector load for transistors 16 and 17 and the source of base turn-on current for transistor 15 is provided by means of resistor 37.

The base of current sensing transistor 16 is connected with a resistor 20 to protect it from damage due to excessive current flow.

A number of diodes 31, 32 and 33 are connected in series as shown with the emitters of the respective transistors and provide a turnoff bias source for the voltage sensing and current sensing transistors. Diodes 32 and 33 also function to maintain thermal compensation for and similar nonlinear characteristics to the isolation charging diode 25 such that the current sensing transistor 16 reads only the linear resistive IR drop across resistor 29. Resistor 34 maintains flow through the diodes 31–33 so as to provide constant voltage drops across the diodes when transistor 15 is in an "off" condition.

Resistor 38 provides a trickle current path to the field coil 11 to supply a small starting flux when there is no field current supply from armature 10.

Zener diode 39 may also be provided as shown, when the regulator is to be used with a (no charge) trouble indicator lamp 41, being connected thereto through the dashboard 40 of the vehicle. Its function is to prevent the generator field winding from receiving lamp current, when the field potential is low at high engine r.p.m.

Resistor 35 is used to maintain static potential for low voltage shutoff.

From the foregoing description, it will be apparent that the control device of the present invention offers the following advantages:

(1) The transistorized version is electrically quieter since the system response time is not limited by the electromechanical response time of relays, but by the flux change rate of the generator's internal magnetic field since the accompanying transistor response rate is virtually insignificant in comparison thereto. The armature output path is never interrupted to secure current regulation.

(2) There are no adjustments, initially or thereafter.

(3) The unit is not subjected to mechanical deterioration since there are no moving parts.

(4) Regulation is absolute and steady even with uneven engine acceleration, sporadic drive belt slippage and worn generator brushes.

(5) The unit can compete economically with electro-mechanical units.

(6) The unit may be made directly interchangeable with electromechanical units.

While there is above described but one embodiment of the control device of the present invention, it will be apparent that other embodiments and variations may be produced within the scope of the inventive concept herein disclosed.

I claim:

1. In an electrical generator system including a battery having positive and negative terminals, a generator for charging the battery and having an armature and a field winding connected with the positive terminal of the battery, the combination with first, second and third transistors each having a base, an emitter and a collector, the emitter and collector of said first transistor being connected respectively with said armature and said field winding, the collectors of said second and third transistors being connected with the base of said first transistor, said first transistor normally being conductive and passing current from said armature to said field winding, said second and third transistors normally being nonconductive, a Zener diode connected in series with the base of said second transistor and exhibiting breakdown at a level just below maximum armature voltage output for biasing said second transistor from a nonconductive to a conductive state, the base of said third transistor being connected with the positive terminal of said battery, current flow from said armature to said battery at substantially maximum value biasing said third transistor from a nonconductive to a conductive state, said second and third transistors when conductive back biasing said first transistor to a nonconductive state, of a pair of series arranged diodes connected in series with the emitters of said second and third transistors and said armature, said pair of series arranged diodes back biasing said second and third transistors to a nonconductive state when the voltage and current outputs of said armature are less than maximum.

References Cited

UNITED STATES PATENTS 2,892,165  6/1959  Lindsay _____ 323—22
3,201,681  8/1965  Van Wilgen et al. ____ 322—25

LEE T. HIX, *Primary Examiner.*

S. WEINBERG, *Assistant Examiner.*

U.S. Cl. X.R.

320—64; 322—25, 73